US006864595B2

(12) United States Patent
Wall

(10) Patent No.: US 6,864,595 B2
(45) Date of Patent: Mar. 8, 2005

(54) DETECTION OF ISLANDED BEHAVIOR AND ANTI-ISLANDING PROTECTION OF A GENERATOR IN GRID-CONNECTED MODE

(75) Inventor: Simon R. Wall, Faversham (GB)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 10/812,979

(22) Filed: Mar. 31, 2004

(65) Prior Publication Data

US 2004/0178641 A1 Sep. 16, 2004

Related U.S. Application Data

(62) Division of application No. 09/975,148, filed on Oct. 12, 2001, now Pat. No. 6,815,932.
(60) Provisional application No. 60/240,153, filed on Oct. 12, 2000.

(51) Int. Cl.[7] .............................. F01D 15/10; F02C 6/00; H02K 7/18; H02P 9/04
(52) U.S. Cl. ....................................................... 290/52
(58) Field of Search ................................. 290/52, 40 R, 290/40 C; 322/20, 37, 44; 307/70, 85, 145; 327/156; 331/17

(56) References Cited

U.S. PATENT DOCUMENTS

| | | | | |
|---|---|---|---|---|
| 3,924,140 A | * | 12/1975 | Yannone .................... | 290/40 R |
| 4,344,027 A | | 8/1982 | Karlicek ........................ | 322/7 |
| 4,707,142 A | * | 11/1987 | Baker et al. ................... | 368/46 |
| 4,763,059 A | * | 8/1988 | Espelage et al. ............ | 318/811 |
| 4,816,696 A | * | 3/1989 | Sakayori et al. .............. | 290/52 |
| 5,483,147 A | | 1/1996 | Ilic et al. ....................... | 322/25 |
| 5,568,023 A | | 10/1996 | Grayer et al. ............... | 318/139 |
| 6,118,187 A | | 9/2000 | Hepner et al. ............ | 290/40 B |
| 6,410,992 B1 | | 6/2002 | Wall et al. .................... | 290/52 |
| 6,487,096 B1 | | 11/2002 | Gilbreth et al. ............... | 363/35 |
| 6,522,030 B1 | * | 2/2003 | Wall et al. ..................... | 307/43 |
| 6,538,518 B1 | | 3/2003 | Chengson ..................... | 331/17 |
| 6,657,332 B2 | | 12/2003 | Balas ........................... | 310/58 |
| 6,657,348 B2 | | 12/2003 | Qin et al. ............. | 310/156.38 |
| 2002/0089234 A1 | | 7/2002 | Gilbreth et al. ............... | 307/80 |
| 2002/0175522 A1 | * | 11/2002 | Wacknov et al. ............. | 290/52 |
| 2003/0222507 A1 | * | 12/2003 | Deng ........................... | 307/87 |

OTHER PUBLICATIONS

John Stevens, et al., and Greg Kern; "Development and Testing of an Approach to Anti–Islanding in Utility–Interconnected Photovoltaic System;" SAND 2000–1939; Aug., 2000; pp. 1–58.

(List continued on next page.)

*Primary Examiner*—Nicholas Ponomarenko
*Assistant Examiner*—Julio Gonzalez
(74) *Attorney, Agent, or Firm*—Waddey & Patterson; Lucian Wayne Beavers

(57) ABSTRACT

A method of controlling a generator system connected to an electric power system in which the output frequency characteristic of the generator system is measured, a first phase angle and frequency of the measured frequency characteristic is estimated using a first phase locked loop having a first bandwidth, and a second phase angle and frequency of the measured frequency characteristic is estimated using a second phase locked loop having a second bandwidth greater than the first bandwidth. Further, the method calculates a frequency difference between the first and second estimated frequencies, and an angle variation that is proportional to the calculated frequency difference. The estimated second phase angle is then added to the calculated angle variation so as to form an output current phase angle reference, and an output current phase angle of the generator system is controlled to be aligned with the output current phase angle reference. The method also determines whether or not the generator system is within a generation island based on the measured frequency characteristic.

18 Claims, 15 Drawing Sheets

OTHER PUBLICATIONS

M.E. Ropp, M. Begovic, and A. Rohatgi; "Analysis and Performance Assessment of the Active Frequency Drift Method of Islanding Prevention;" IEEE Transactions on Energy Conversion; vol. 14, No. 3, IEEE, Sep., 1999; pp. 810–816.

Simon R. Wall; "Performance of Inverter Interfaced Distributed Generation;" 2001 IEEE/PES Transmission and Distribution Conference and Exposition: Developing New Perspectives; IEEE, Oct. 28–Nov. 2, 2001; pp. 945–950; 2001. I.

* cited by examiner

DETECTION OF ISLANDED BEHAVIOR AND ANTI-ISLANDING PROTECTION OF A GENERATOR IN GRID-CONNECTED MODE

CROSS-REFERENCE TO A RELATED APPLICATIONS

This application is a divisional of U.S. application Ser. No. 09/975,148, filed Oct. 12, 2001 now U.S. Pat. No. 6,815,932, which claims the benefit of U.S. Provisional Application No. 60/240,153, filed Oct. 12, 2000, each of which is incorporated herein by reference in its entirety.

FIELD OF THE INVENTION

The present invention relates to controlling a generator system connected to an electric power system so as to avoid the unintentional islanding of the generator. More particularly, the present invention relates to actively detecting generation islands using a combination of frequency characteristic thresholds, and an active phase angle destablization technique to destablize well or perfectly matched islands.

BACKGROUND OF THE INVENTION

Many businesses, manufacturing companies, homeowners, etc. use generators in addition to power delivered by the local electric power company (also referred to as an electric power system or utility grid). However, non-utility owned generator systems connected to an electric power system create both operational and maintenance problems.

The operational problems include a non-utility owned generator system not being synchronized with a de-energized power grid included in the electric power system. The lack of synchronism between the non-utility owned generator system and the electric power system cause a higher than normal voltage across open isolation devices included between the non-utility owned generator and the electric power system, as well as higher than normal current flow when the isolation devices are closed. The higher than normal voltages across the opened isolation devices damages the devices and the higher than normal current flows tend to prematurely open over-current protection devices associated with the non-utility owned generator system and the electric power system.

Maintenance problems include personnel inadvertently contacting portions of the electric power system which are energized from the non-utility owned generator system. This is a severe problem which often results in injury or even death. For example, during a severe winter storm, utility companies have to dispatch emergency crews throughout neighborhoods to repair downed transmission lines, etc. To safely repair the downed lines, isolation devices corresponding to a power grid including the downed transmission lines are intentionally opened so the downed lines and associated transmission components are de-energized. However, if a homeowner plugs in a portable generator system to provide electricity for his family, for example, the power from the portable generator system may be fed back into the de-energized power lines, transformers etc, critically injuring a maintenance worker.

To avoid these types of possibly fatal injuries, the utility company would have to manually isolate all portable generator systems, etc., connected to the local grid requiring maintenance so as to bring the voltage to a safe level before beginning any maintenance work. This is extremely ineffective and time-consuming. In fact, it is virtually impossible to know when and where every portable generator system will be used. Thus, the power companies require generator systems connected to the utility grid to include protective devices.

SUMMARY OF THE INVENTION

The present invention is directed to solving the above and other noted problems.

To solve these problems, the present invention provides a novel method of controlling a generator system connected to an electric power system in which an output current phase angle of the generator system is varied, and an output frequency characteristic of the generator system is measured. Further, the method determines whether or not the generator system is within a generation island based on the measured frequency characteristic In another method, the output frequency characteristic of the generator system is measured, a first phase angle of the measured frequency characteristic is estimated using a first phase locked loop having a first bandwidth, and a second phase angle of the measured frequency characteristic is estimated using a second phase locked loop having a second bandwidth greater than the first bandwidth. Further, a phase shift between the estimated first and second phase angles is calculated, and the method determines whether or not the generator system is within a generation island based on the calculated phase shift.

In still another method, the output frequency characteristic of the generator system is measured, a first phase angle and frequency of the measured frequency characteristic is estimated using a first phase locked loop having a first bandwidth, and a second phase angle and frequency of the measured frequency characteristic is estimated using a second phase locked loop having a second bandwidth greater than the first bandwidth. Further, the method calculates a frequency difference between the first and second estimated frequencies, and an angle variation that is proportional to the calculated frequency difference. The estimated second phase angle is then added to the calculated angle variation so as to form an output current phase angle reference, and an output current phase angle of the generator system is controlled to be aligned with the output current phase angle reference. The method also determines whether or not the generator system is within a generation island based on the measured frequency characteristic.

The present invention also provides novel computer program products coded to execute the above methods within a generator system.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention will be described with reference to a MICRO-TURBINE generator system manufactured and sold by Capstone Turbine Corporation. However, the present invention may also be implemented with other generator systems and distributed resources. Accordingly, prior to discussing the detection methods according to the present invention, a description of a turbogenerator system and corresponding power controller of a MICRO-TURBINE generator will be given with reference to FIGS. 1 and 2.

Mechanical Structural Embodiment of a Turbogenerator

Figure 1A:
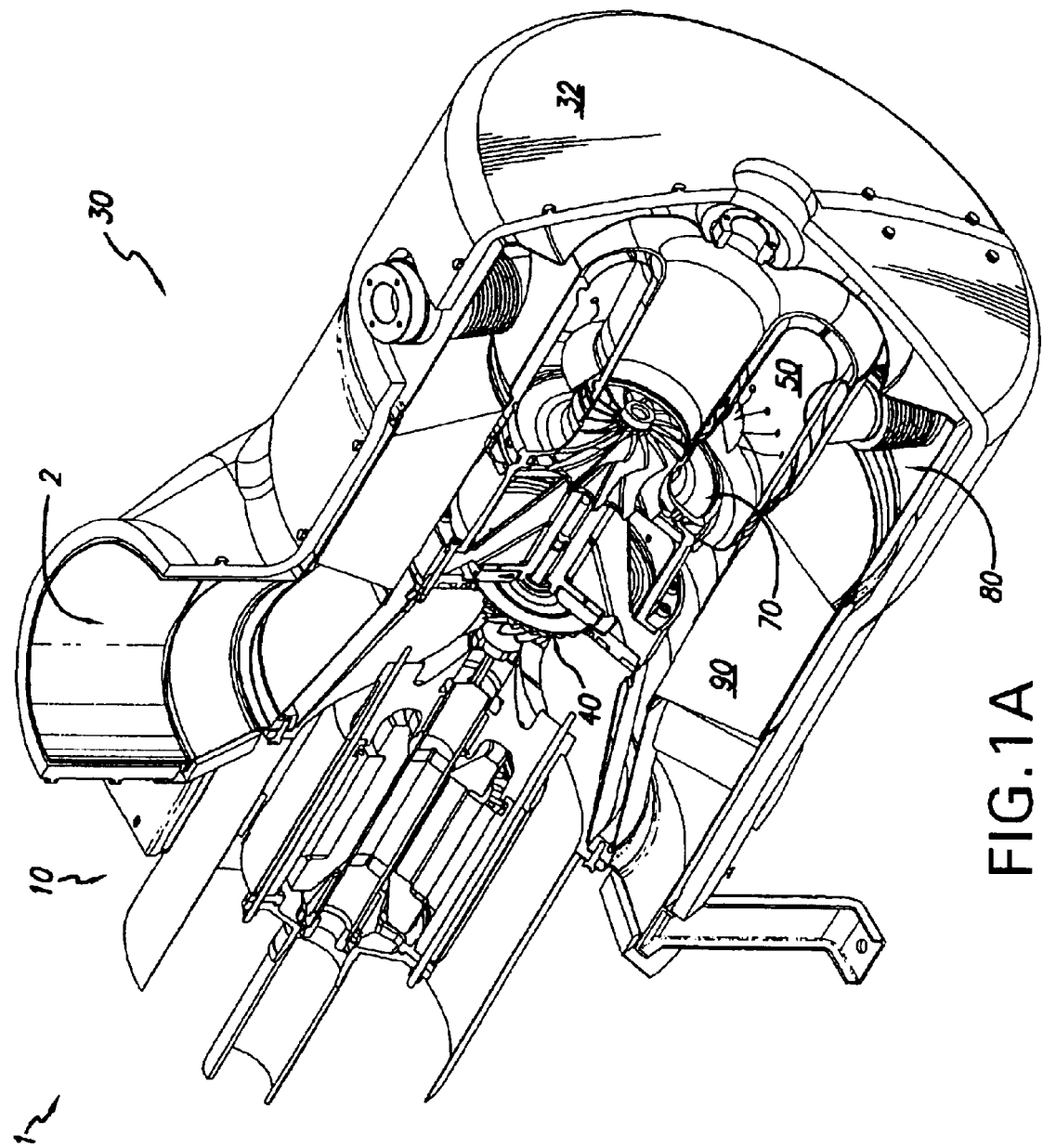
FIG. 1A is perspective view, partially in section, of an integrated turbogenerator system.

With reference to FIG. 1A, an integrated turbogenerator 1 according to the present invention generally includes motor/generator section 10 and compressor-combustor section 30. Compressor-combustor section 30 includes exterior can 32, compressor 40, combustor 50 and turbine 70. A recuperator 90 may be optionally included.

Figure 1B:
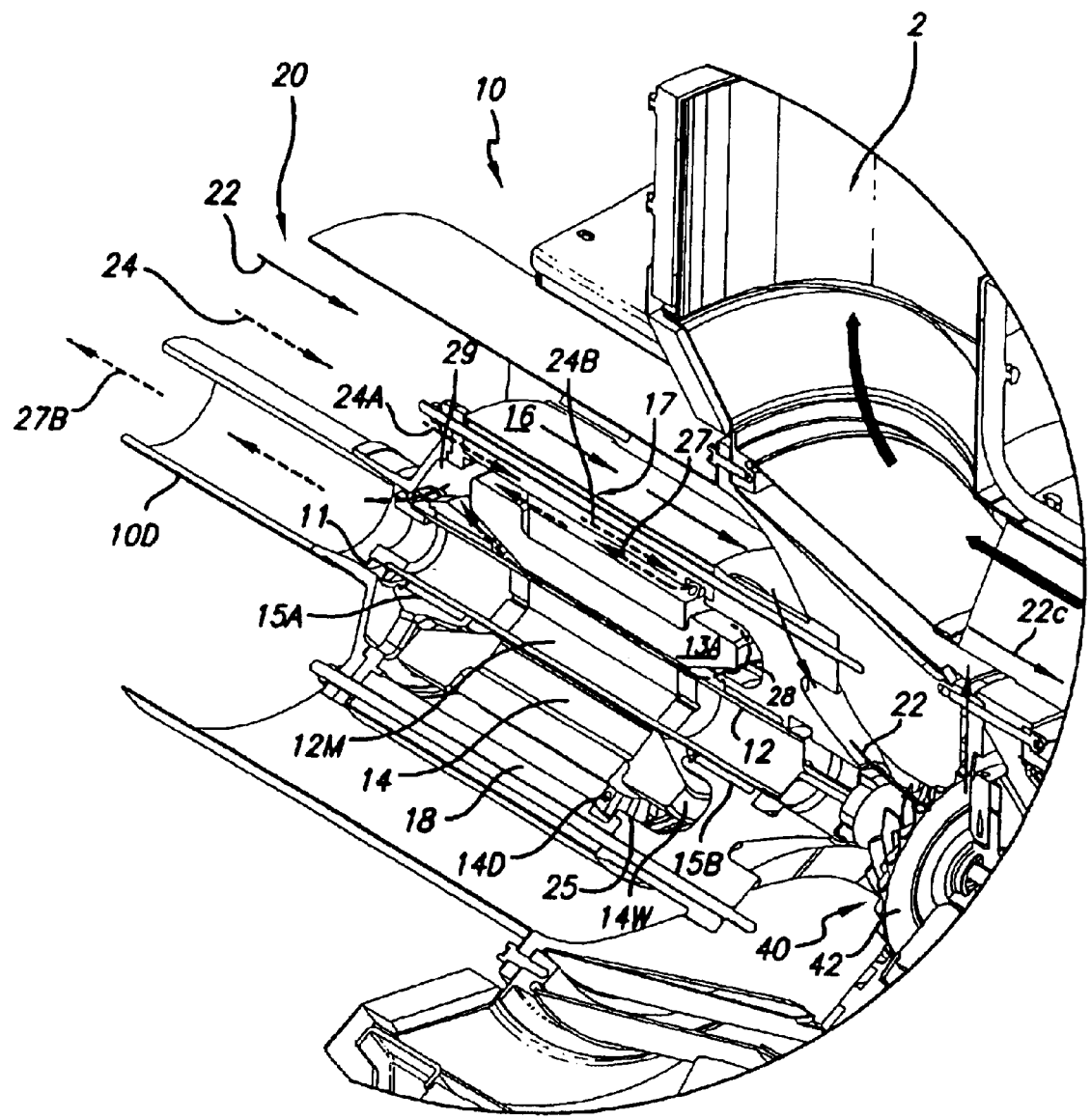
FIG. 1B is a magnified perspective view, partially in section, of the motor/generator portion of the integrated turbogenerator of FIG. 1A.
Figure 1C:
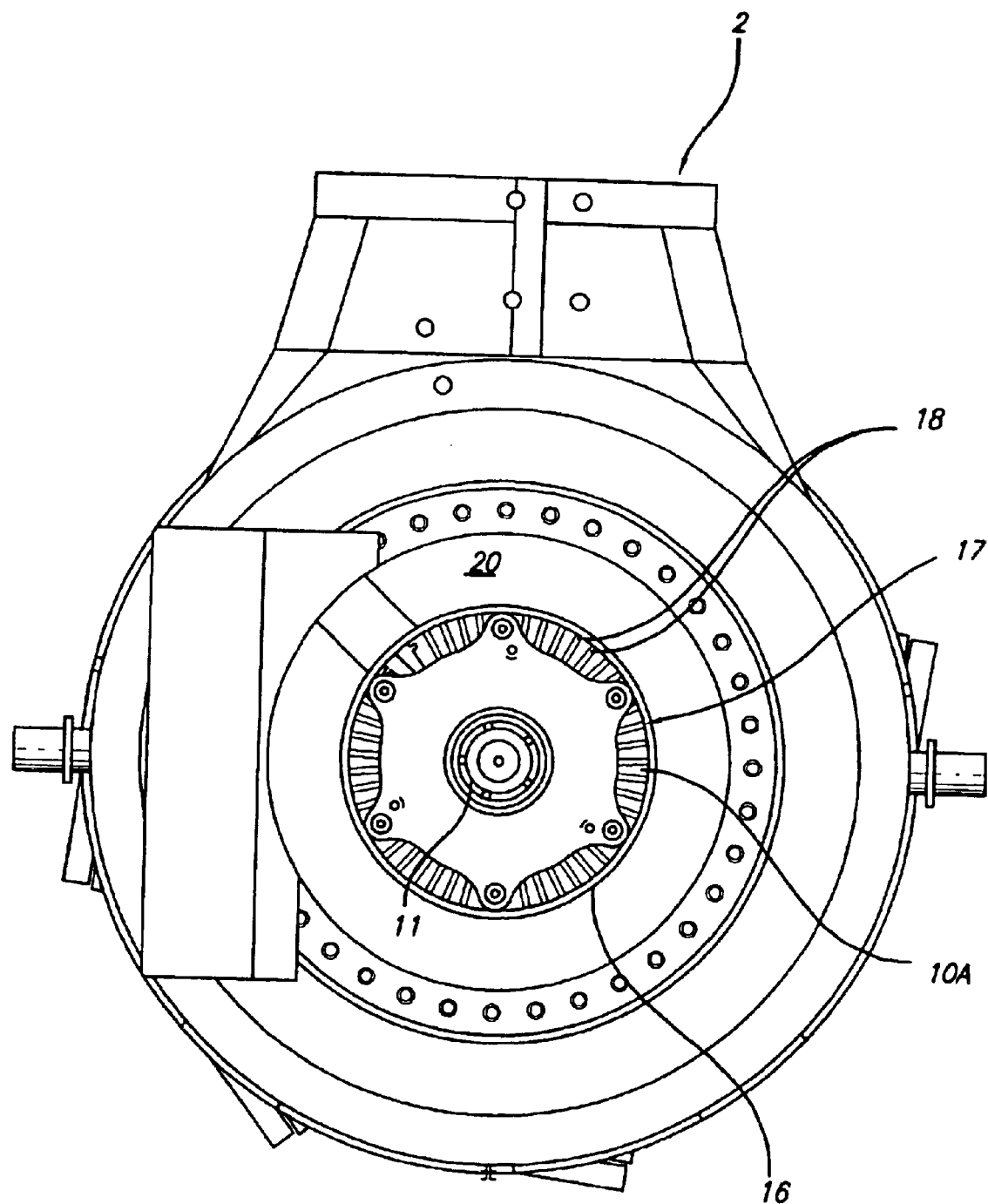
FIG. 1C is an end view, from the motor/generator end, of the integrated turbogenerator of FIG. 1A.

Referring now to FIG. 1B and FIG. 1C, in a currently preferred embodiment of the present invention, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
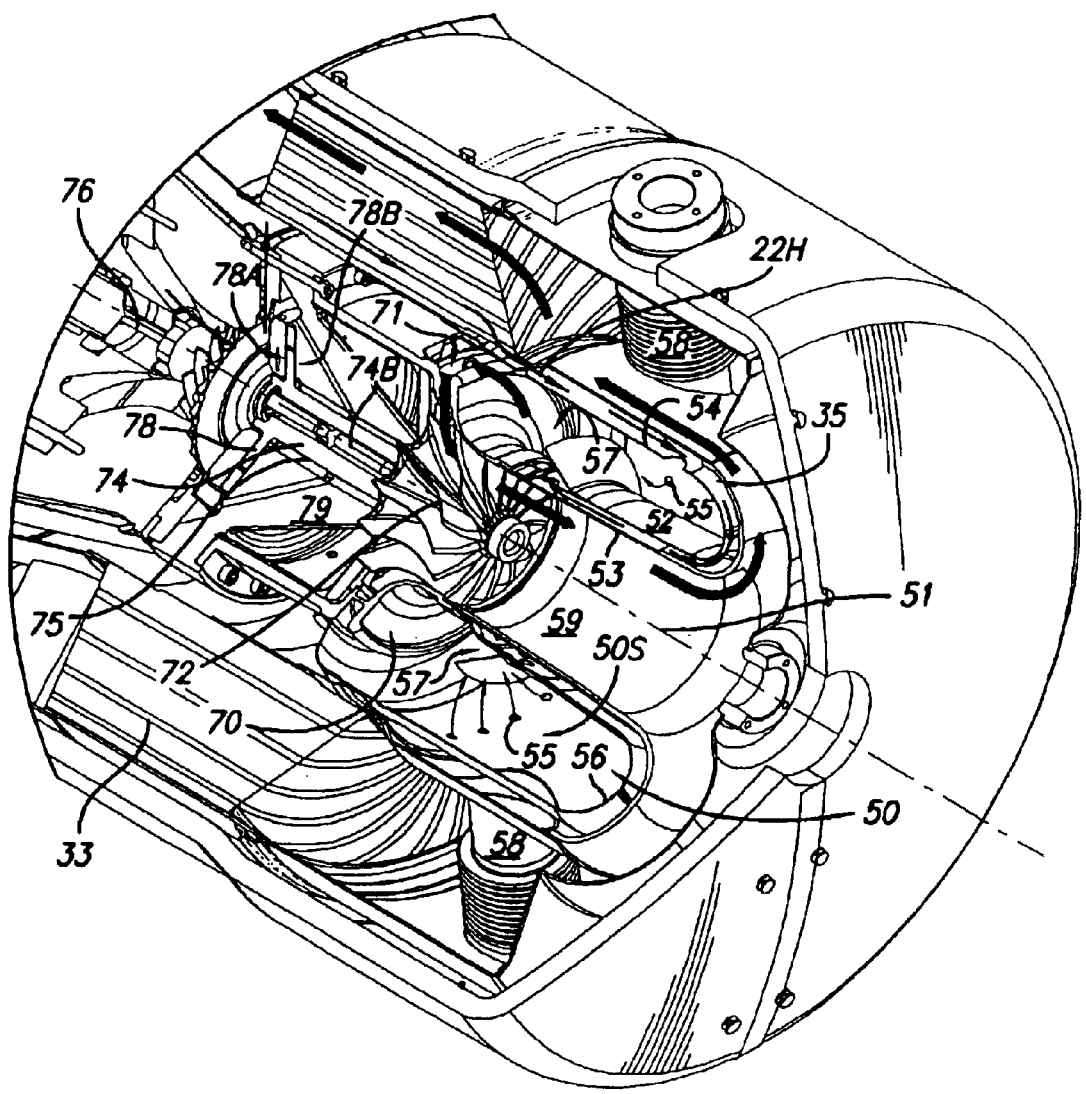
FIG. 1D is a magnified perspective view, partially in section, of the combustorturbine exhaust portion of the integrated turbogenerator of FIG. 1A.
Figure 2:
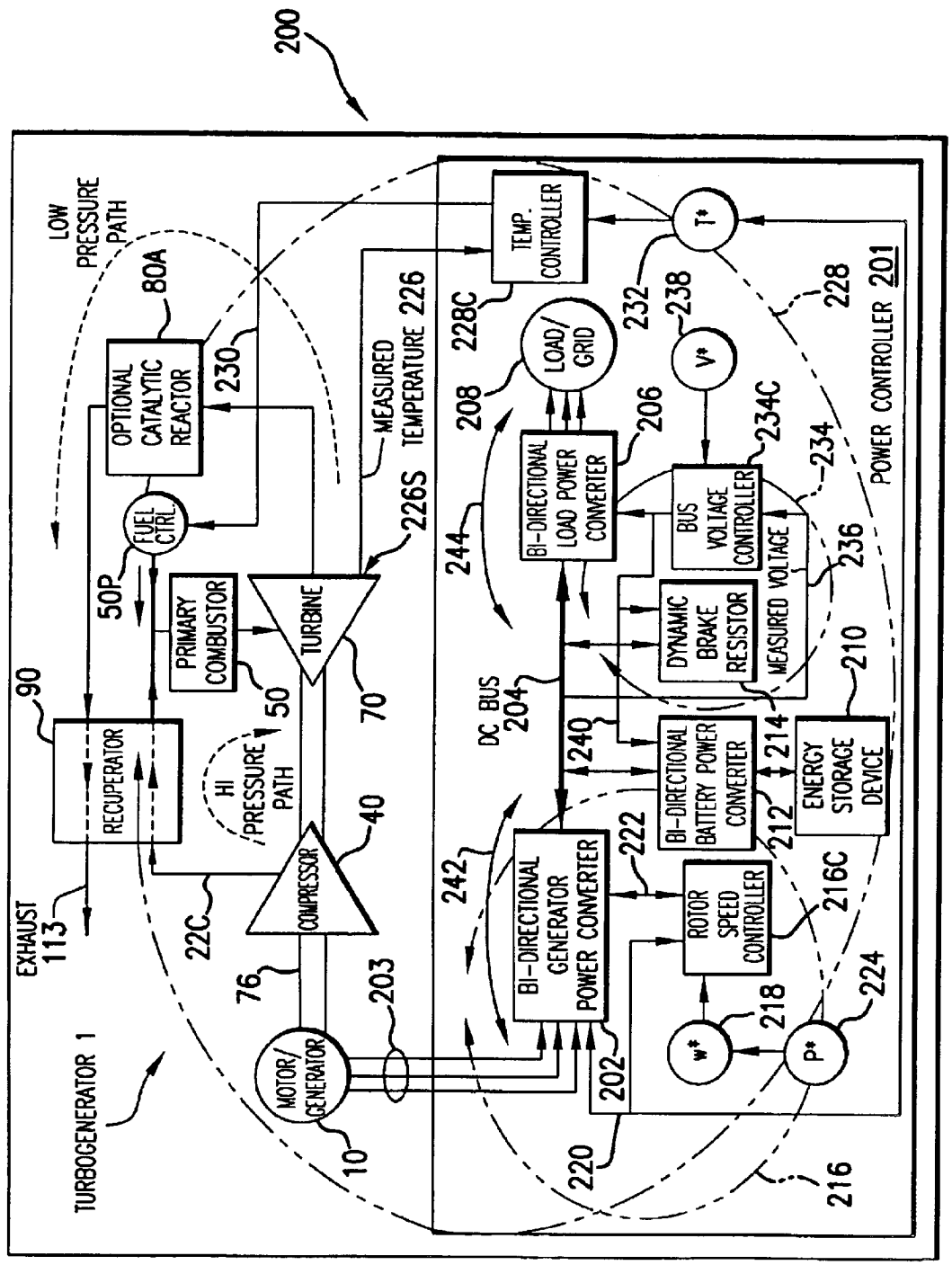
FIG. 2 is a block diagram schematic of a turbogenerator system including a power controller having decoupled rotor speed, operating temperature, and DC bus voltage control loops.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 51. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 76 is rotatably supported preferably by a bilateral thrust bearing 78A and 78B. Journal or radial bearing 75 and thrust bearings 78A and 78B may be fluid film or foil bearings.

Turbine wheel 72, Bearing rotor 74 and Compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
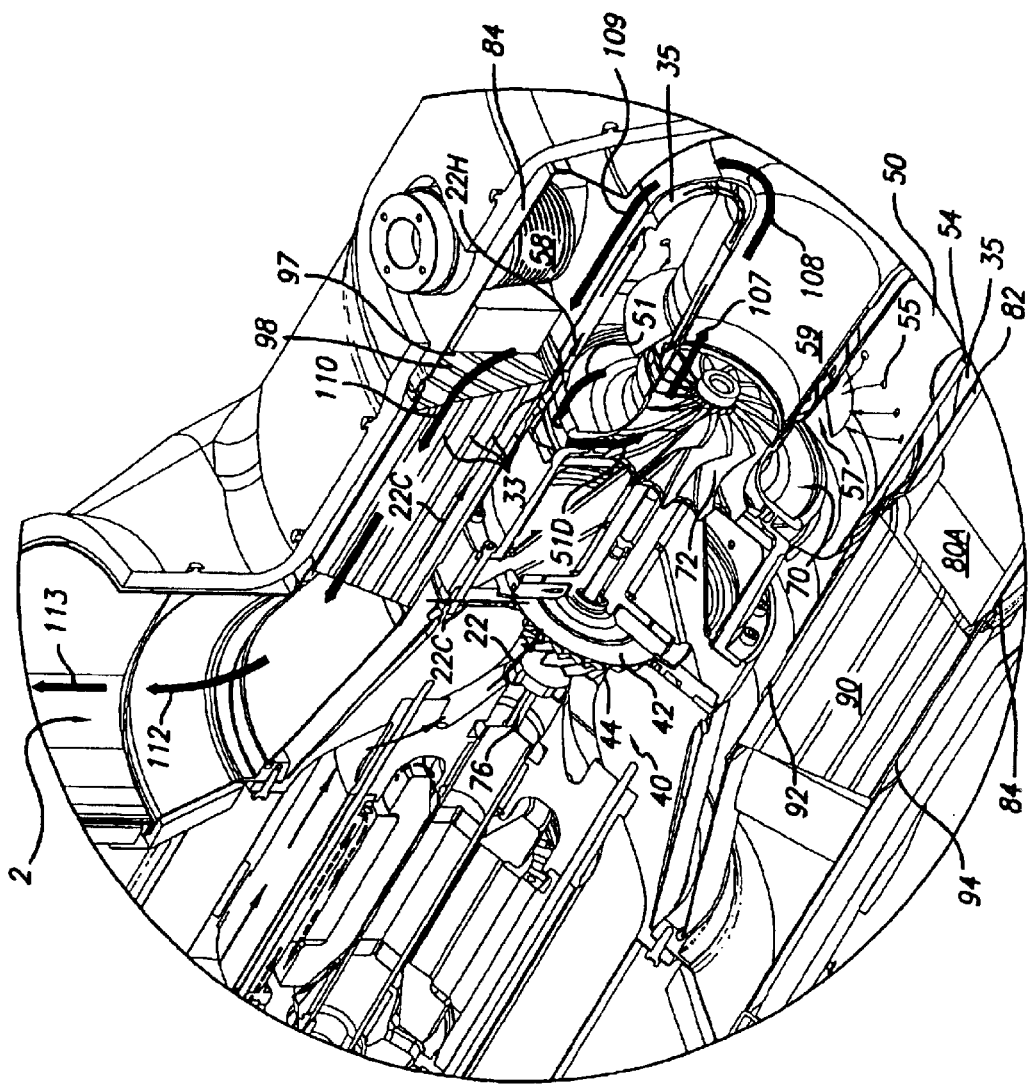
FIG. 1E is a magnified perspective view, partially in section, of the compressorturbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 98 of recuperator 90, as indicated by gas flow arrows 108 and 109 respectively.

In an alternate embodiment of the present invention, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

Alternative Use of the Invention Other than in Integrated Turbogenerator

An integrated turbogenerator is a turbogenerator in which the turbine, compressor, and generator are all constrained to rotate based upon rotation of the shaft to which the turbine is connected. The invention disclosed herein is preferably but not necessarily used in connection with a turbogenerator, and preferably but not necessarily used in connection with an integrated turbogenerator.

Turbogenerator System Including Controls

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bi-directional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bi-directional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Under normal conditions, the turbogenerator system 2 is running in parallel with other synchronous generators within the electric power system and a magnitude and phase angle of the output current of turbogenerator system 2 has little impact on the frequency and phase angle of the voltage at the point of connection (POC) of the generator. However, when the turbogenerator system 2 is not running in parallel with other synchronous generators within the electric power system, or is within a generation island, several problems occur.

Figure 3:
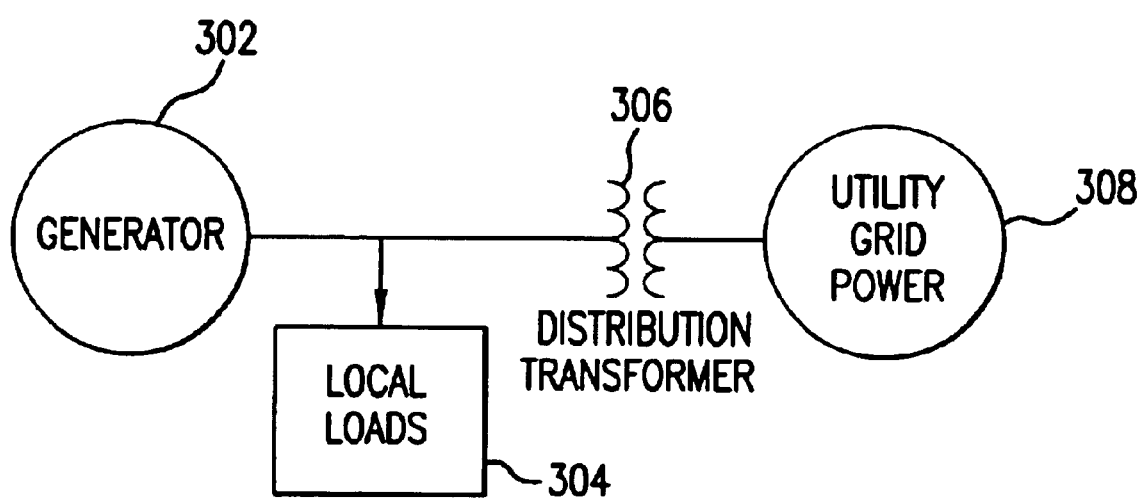
FIG. 3 is an overview of a generator system included in a grid-connected system configuration.

For example, FIG. 3 illustrates generator system 302 connected in parallel to utility grid 308 so as to power local loads 304. Further, generator 302 and local loads 304 are connected to the utility grid 308 via a distribution transformer 306.

When installed in this fashion, the power generated by generator system 302 is supplied to local loads 304 only when a voltage from utility grid 308 is present. That is, generator system 302 senses a loss of voltage during utility grid voltage interruptions, and disconnects from utility grid 308 and local loads 304. When the utility grid voltage returns to within specified limits, generator system 302 may be programmed to restart and recommence supplying power to the connected local loads 304.

Further, electric power companies commonly require that protective relaying devices be installed with generators connected to the grid. The primary purpose of the protective relaying devices is to ensure that utility wires de-energized by the electric power company will not be energized by generator system 302 (or any number of other non-utility owned generator systems). Historically, the protective relaying devices have been relays or solid state power analyzers that provide control signals to disconnecting relays.

A current problem existing with generator systems operating in a grid-connected mode occurs when generator system 302 continually supplies power to a de-energized utility grid. The continued operation of generator system 302 often results in the formation of a generation island in which a portion of the utility grid, not under utility control, remains energized while isolated from the remainder of the utility system.

Figure 4:
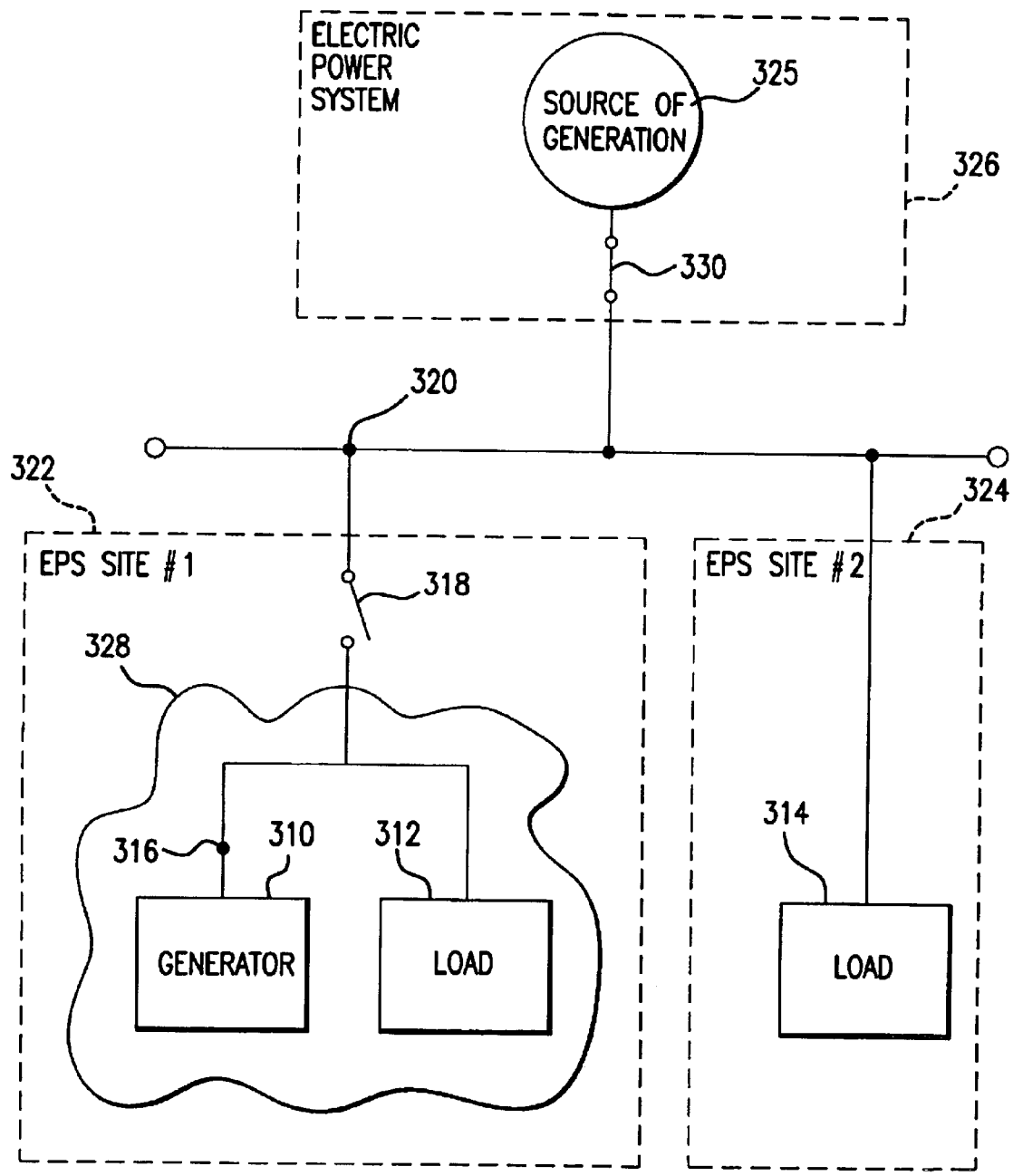
FIG. 4 is a schematic diagram illustrating a generation island within a site containing a generator system.

For example, FIG. 4 illustrates generator system 310 in grid-connected mode to electric power system 326. Also shown are two isolation devices 318 and 330 situated between source of generation system 325 within electric power system 326 and generator system 310. Electric power system 326 provides power to two different sites 322 and 324, for example, but generally supplies power to many different sites. First site 322 includes generator 310 and load 312, which are connected to electric power system 326 via isolation devices 318 and 330. Second site 324 includes load 314 and is connected to electric power system 326 via isolation device 330.

The example in FIG. 4 illustrates first isolation device 318 being open, which may occur because of a power surge from electric power system 330, etc. Thus, because opened isolation device 318 is between a point of connection (POC) 316 of generator system 310 and a point of common coupling (PCC) 320 of first site 322 and electric power system 326, generation island 328 is formed. Further, generation island 328 is contained within first site 322 where generator system 310 is installed.

Figure 5:
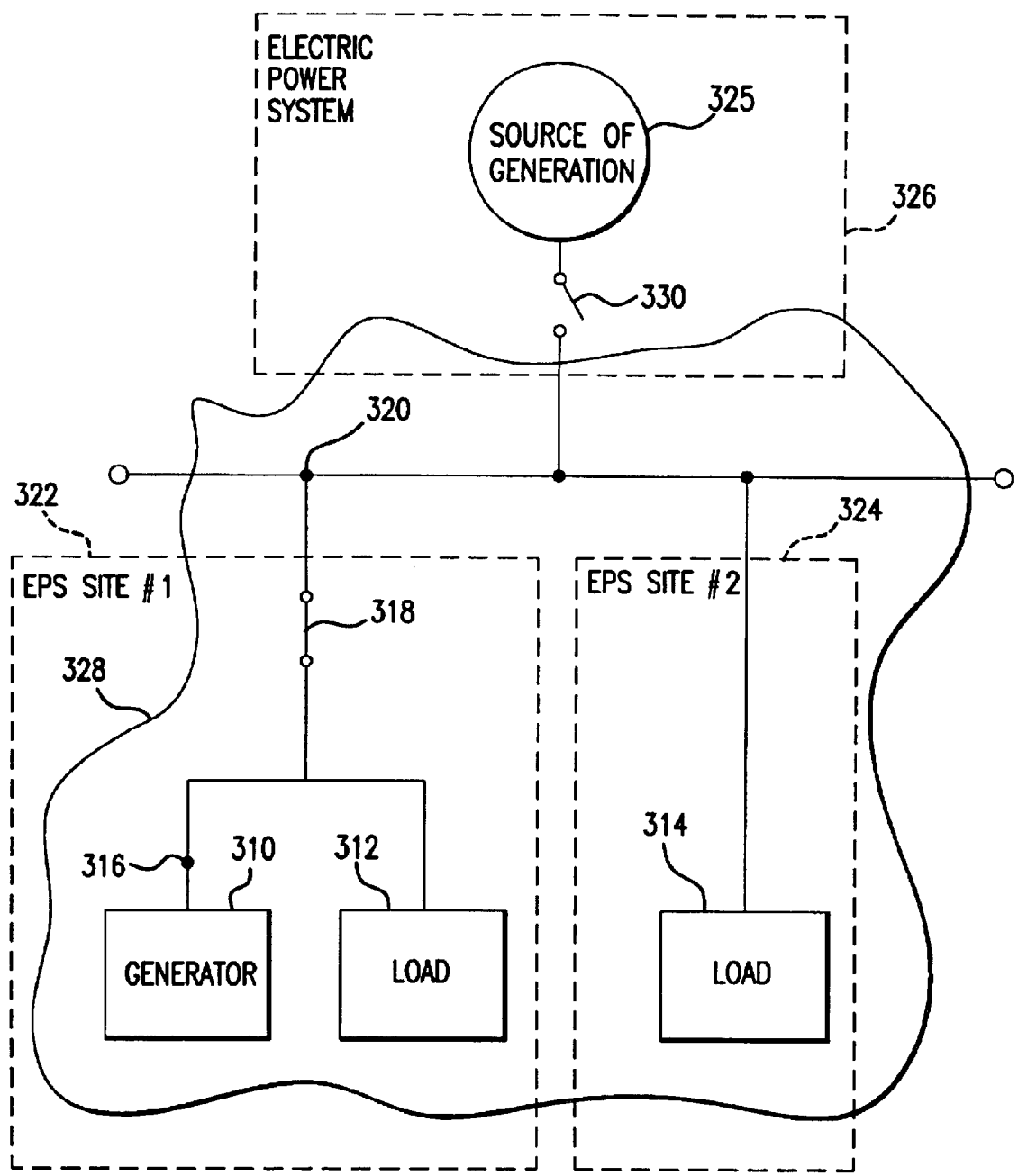
FIG. 5 is a schematic diagram illustrating a generation island encompassing portions of an electric power system as well as operating sites.

FIG. 5 illustrates another example in which first isolation device 318 is closed, but second isolation device 330 is opened. Second isolation device 330 may intentionally be opened so maintenance personnel may begin work on malfunctioning power lines, transformers, etc. For example, a tree limb may fall onto an overhead power line during a storm, which requires maintenance personnel to remove the tree limb. In this scenario, second isolation device 330 may intentionally be open by the electric power company. Second isolation device 330 may also automatically open if a power surge, etc., is detected.

Further, because second opened isolation device 330 is beyond PCC 320, generation island 328 will include parts of electric power system 326 (such as power lines, transformers, etc.) and possibly other sites served by electric power system 326 (such as second site 324).

The sustained existence of generation islands 328 shown in FIGS. 4 and 5 creates substantial operational and maintenance problems. The operational problems include a lack of synchronism between electric power system 326 and generator system 310, which as discussed above causes a higher than normal voltage across open isolation devices 318, 330, and higher than normal current flow when the isolation devices are closed. The higher than normal voltage across the opened devices damages the devices and the higher than current flow tends to open over current protection devices prematurely.

A variety of protective devices use passive schemes to detect islanding conditions so as to prevent a generator system from sustaining an unintentional island. The passive schemes measure electrical variables at the POC or PCC and detect conditions that indicate an island has been formed.

For example, one detection method includes measuring a voltage value (or current value) at the output of the generator (i.e., at the POC of the generator), and determining if the measured voltage value exceeds a lower or upper voltage threshold for a specified period of time. The voltage thresholds and time period are generally stored within a memory contained in a process controller of the generator. If the measured values reach or exceed either the lower or upper voltage thresholds for the set time period, the generator system can be immediately shut down to avoid the sustainment of a generation island.

In addition, in a poorly matched generation island, the output generator voltage generally reaches or exceeds the lower or upper voltage thresholds. That section normally contains substantially more loads than the connected non-utility owned generator systems. A poorly matched island often occurs when a utility company de-energizes a power grid, because the de-energized power grid contains a significant number of loads.

However, the passive schemes are insufficient in detecting well matched or perfectly matched islands. In more detail, an island may be well matched or perfectly matched if the total power output by the generator system substantially equals the power required by the load(s). That is, a well matched generation island is one where the real power from the generator system can be delivered to an islanded load without exceeding the lower or upper voltage thresholds.

For example, if electric motors form a substantial fraction of the islanded load, then the electric motors are capable of generating enough power to support the voltage in the island for a few cycles. In this instance, a poorly matched island may appear well matched until the electric motors are no longer able to support the voltage in the island. Thus, in this instance, the detection of the generation island by the passive schemes will be delayed.

In addition, the impedance magnitude and phase angle of the output power from the generator system are often non-linear functions of the voltage in the generation island. Examples of non-linear loads include electric motors and loads that trip or drop-out on under voltages. These non-linear loads can increase the probability of an island being well-matched.

Further, the passive protection features are very sensitive to disturbances on the electric power system, such as voltage sags, surges, etc. Thus, the protection features often trip on voltage sags, surges, switching transients and successful "instantaneous" reclosure events. A complete shutdown of the generator system for all of these cases is inefficient.

In addition, the time period at which passive schemes detect generation islands varies and is typically more than 10 cycles of a nominal supply frequency and in some cases may be greater than 10 seconds. These lengthy time periods contribute to the maintenance problems discussed above.

In addition, as noted above, under normal conditions the generator system is running in parallel with other synchronous generators within the electric power system and a magnitude and phase angle of the output current of generator system has little impact on the frequency and phase angle of the voltage at the point of connection (POC) of the generator system.

Figure 6:
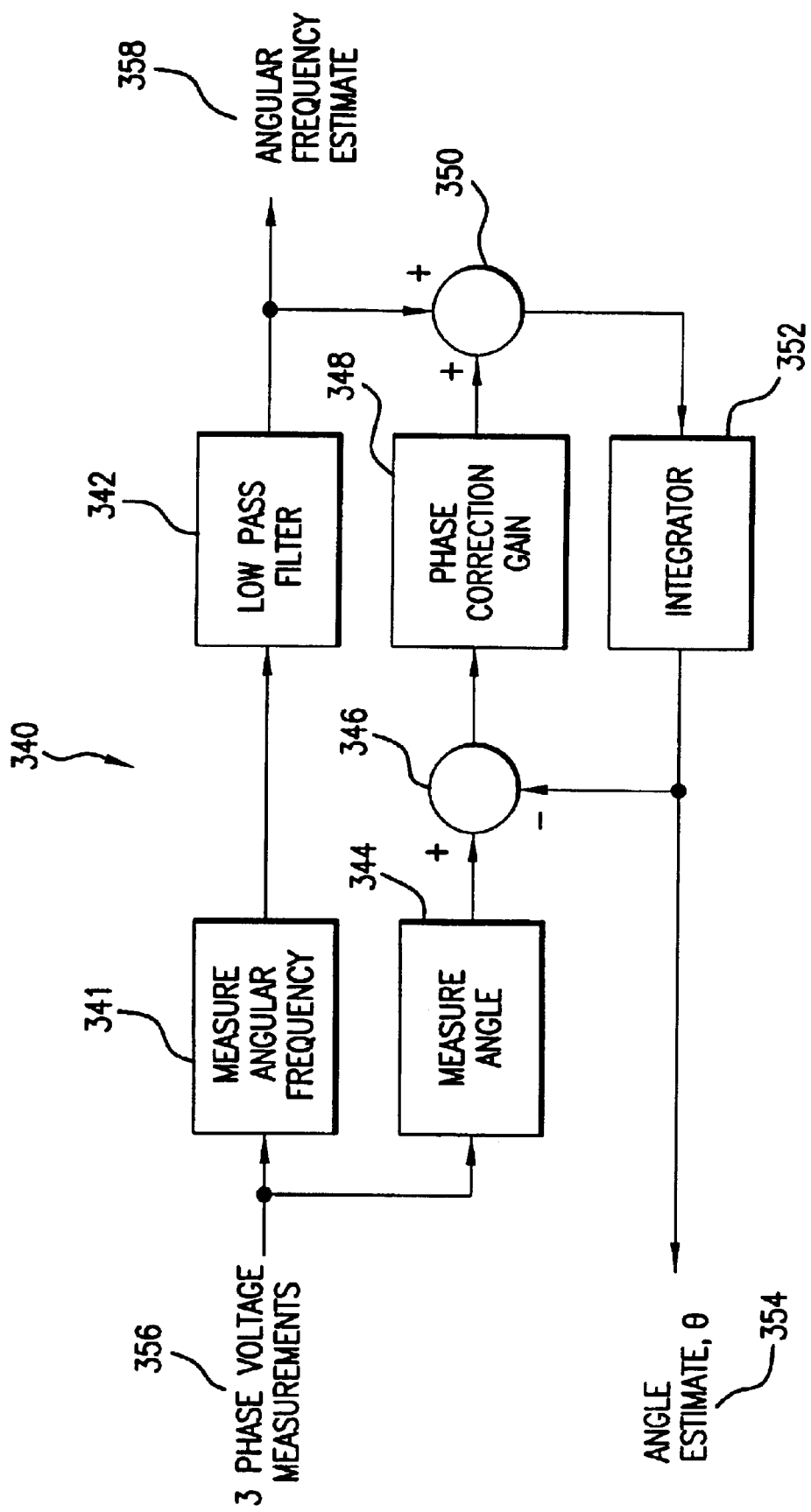
FIG. 6 is a schematic diagram illustrating a Phase Locked Loop for synchronizing a generator system with an electric power system.

In more detail, a generator system in a grid-connected mode utilizes a Phase Locked Loop (PLL) to create an internal angle reference that in the steady state has the same frequency and phase as the voltage measured at the POC. For example, FIG. 6 illustrates PLL structure 340 configured to provide such a feedback process.

As shown, PLL 340 include low pass filter 342, angle and frequency measurement components 341, 344, phase correction gain component 348, integrator 352, adder 350 and subtractor 346. Low pass filter 342 has unity gain for DC signals, and thus angular frequency estimate 358 output by PLL 340 will be exact when a frequency of the electric power system is constant (or varying very slowly). Further, angle estimate 354 output by PLL 340 is formed by integrating angular frequency estimate 358 via integrator 352. The values output by PLL 340 (i.e., angle estimate 354 and angular frequency estimate 358) are used so the generator system produces the substantially the same frequency and phase as the voltage measured at POC 316.

That is, when the frequency of the electric power system is constant (or varying very slowly), angle estimate 354 will track the angle of the voltage at POC 316, but may have a constant phase error due to the unknown constant of integration. Thus, to lock the outputs of PLL 340 in phase as well as in frequency a feedback loop is used. The feedback loop adjusts an input to integrator 352 according to an error between a measured angle from measured angle component 344 and angle estimate 354 via subtractor 346, phase correction gain 348 and adder 350. In addition, for PLL 340 to be stable, the input to integrator 352 is increased if the measured angle from measured angle component 344 leads estimated angle 354 and is reduced is the measured angle lags estimated angle 354.

However, when a generation island is formed, the frequency and voltage angle at the POC are significantly affected by the magnitude and phase angle of the current of the generator system. This phenomenon can be best described with reference to FIG. 7.

Figure 7:
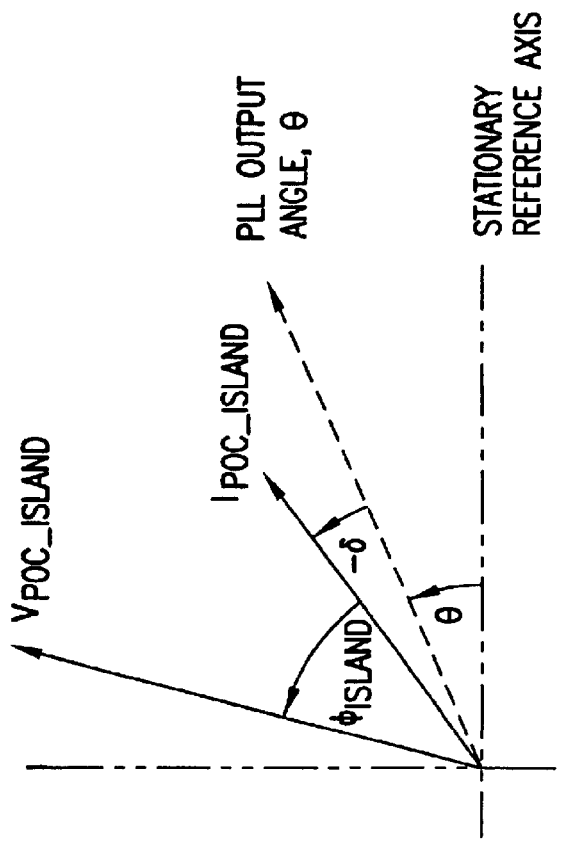
FIG. 7 is a graph illustrating voltage and current phase angles of a generator island comprising a generator system and associated loads.

In more detail, as shown in FIG. 7, the impedance phase angle $\phi_{Island}$ looking into the POC determines the phase angle between the generator system voltage $V_{POC\text{-}Island}$ and the current $I_{POC\text{-}Island}$. This phase angle is also affected by the generator system frequency. Further, the real and reactive power demands required by the turbogenerator system determine the phase angle $\delta$ between the generator system current and angle estimate 354 produced by PLL 340 included in the generator system. The fixed relationship between the angle estimate and the actual current phase angle is ensured by the closed loop current control employed in the generator system (i.e., by Bi-directional load power converter 206).

Referring again to FIGS. 6 and 7, PLL 340 will only reach a steady condition when the angle estimate θ is aligned with the angle of the measured voltages at the POC. Therefore, the generator system will be contained indefinitely in a perfectly matched island only if:

$$\phi_{Island} = \delta \quad (1)$$

If the island is not perfectly matched, the angular frequency estimate produced by PLL 340 will continue to increase and force the actual generator system output frequency to exceed the upper frequency trip threshold or will continue to decrease and force the actual generator system output frequency to exceed the lower frequency trip threshold.

Further, a perfectly matched generation island can only be sustained if it represents a locally stable equilibrium point. The stability of a perfectly matched generation island may be examined using a perturbation analysis. For example, assume a small increase is applied to angular frequency estimate 358 in PLL 340, which results in an increase in the frequency being applied to the islanded loads. If the impedance phase angle $\phi_{Island}$ increases because the angular frequency estimate 358 is increased, PLL 340 will tend to further increase angular frequency estimate 358 so as to follow the increase in the voltage phase angle. In this case, the island will be unstable.

On the contrary, if the impedance phase angle $\phi_{Island}$ reduces because frequency estimate 358 is increased, PLL 340 will tend to reduce angular frequency estimate 358 back towards the equilibrium point so as to follow the decrease in the voltage phase angle. In this case, the generation island will be stable. Similar arguments apply to negative frequency perturbations.

The stability of an island also depends upon the ability to change frequency to reach a new equilibrium point when the current phase angle of the generator system changes. The sensitivity of the frequency to changes in the generator system current phase angle is orders of magnitude greater in a perfectly matched island than it is when the generator system is operating in parallel with synchronous generators in the electric power system.

In more detail, the frequency sensitivity of a perfectly matched island is denoted G and is defined as follows:

$$G = \frac{1}{f_{POC}} \left| \frac{df_{POC}}{d\phi_{Island}} \right| \qquad (2)$$

The frequency sensitivity G is basically a percentage change in frequency brought about from a small change in the current phase angle of the generator system. In addition, a lower bound of the frequency sensitivity represents a generation island that behaves most like a normal operating electric power system.

Regarding the lower boundary, the aggregate islanded load providing the least frequency sensitivity is the one with the largest change in impedance angle for a given change in frequency. For example, linear stable loads such as a parallel resonant circuit operating at the natural resonant frequency provides the least sensitivity. Further, the sensitivity G falls as the quality (Q factor of the resonant load) increases. In more, detail, the natural resonant frequency and Q factor for a parallel RLC circuit are defined as follows:

$$\omega_n = \frac{1}{\sqrt{LC}} \qquad (3)$$

$$Q = \frac{R}{\sqrt{L/C}}$$

The impedance angle of a parallel RLC circuit and a derivative of impedance angle with respect to angular frequency can be expressed as a function of angular frequency, as follows:

$$\phi_{Island}(\omega) = \frac{\Pi}{2} - \tan^{-1}\left(\frac{\omega/\omega_n}{Q(1-\omega^2/\omega_n^2)}\right) \qquad (4)$$

$$\frac{d\phi_{Island}}{d\omega} = \frac{-(1+\omega^2/\omega_n^2)}{\omega_n Q(1+(1/Q^2-2)\omega^2/\omega_n^2 + \omega^4/\omega_n^4)} \qquad (5)$$

To place a lower bound on the frequency sensitivity G of a parallel RLC circuit, it is convenient to place an upper bound on the phase sensitivity $G_{inv}$ (i.e., the inverse of G) defined as follows:

$$G_{inv} = \frac{1}{G} = f_{POC} \left| \frac{d\phi_{Island}}{df_{POC}} \right| = \omega \left| \frac{d\phi_{Island}}{d\omega} \right| \qquad (6)$$

As the above equation notes, $G_{inv}$ is defined as the product of the angular frequency times the magnitude of the derivative of the impedance angle with respect to angular frequency. Further, in a parallel RLC circuit, the phase sensitivity $G_{inv}$, is a function of both $\omega_n$ and Q.

Thus, to place an upper bound on the phase sensitivity $G_{inv}$, a maximization process may be performed for $G_{inv}$ with respect to $\omega_n$.

$$\omega_n = \omega \sqrt{\frac{2Q^2}{1-6Q^2 \pm \sqrt{32Q^4 - 12Q^2 + 1}}} \qquad (7)$$

and thus $$G_{inv\_max}(Q) = \left[\omega \left|\frac{d\phi_{Island}}{d\omega}\right|\right]_{max} = \frac{1}{2\sqrt{1-4Q^2}} \qquad (8)$$

Further, for $Q \geq 1/\sqrt{8}$, $G_{inv}(\omega_n, Q)$ is maximized when $\omega_n = \omega$ and thus $$G_{inv\_max}(Q) = \left[\omega \left|\frac{d\phi_{Island}}{d\omega}\right|\right]_{max} = 2Q \qquad (9)$$

Figure 8:
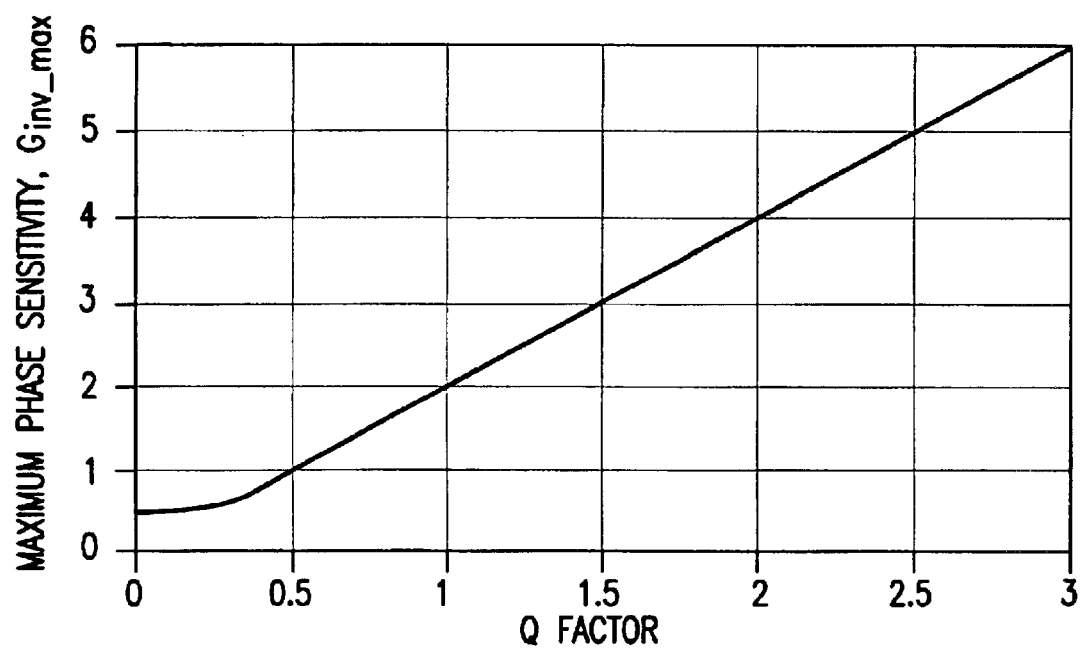
FIG. 8 is a graph illustrating a relationship between a maximum phase sensitivity and quality factor of a resonant load.

FIG. 8 is a graph plotting equations (8) and (9). As illustrated in FIG. 8, the maximum phase sensitivity is a substantially monotonic function of the Q factor. Thus, to place an upper boundary on the maximum phase sensitivity, it is also necessary to find an upper boundary for the Q factor of the aggregate islanded load. The other requirement for the maximum phase sensitivity is the load be resonant at the normal operating frequency of the electric power system. In reality, the situation represents a low power factor inductive load that has been corrected to a unity power factor using power-factor compensation capacitors. Further, the Q factor of the aggregate islanded load is basically the ratio of the reactive power to real power in the inductive load before compensation.

Therefore, to place an upper boundary on the Q factor, the lowest power factor likely to be encountered in an inductive load must be considered. A value of Q=2.5 appears to be an industry consensus value arrived at in the development of IEEE 929, Recommended Practice for Utility Interface of Photovoltaic (PV) Systems. This value corresponds to a power factor of 0.37, which is a reasonable lower bound for an unloaded induction motor.

Thus, assuming an upper bound of Q=2.5, the maximum phase sensitivity is $G_{inv\_max}$ (Q)=5. The minimum frequency sensitivity to phase angle variation $G_{min}$ can then be defined as follows:

$$G_{min} = \frac{1}{[G_{inv\_max}(Q)]_{max}} = \frac{1}{2Q_{max}} = \frac{1}{5} \tag{10}$$

Therefore, a lower bound on the percentage change in the frequency at the POC for a given change in the current phase angle δ can be determined as follows:

$$\frac{\Delta f_{POC}}{f_{POC\_n}} \approx G\Delta\delta \quad \frac{\Delta f_{POC}}{f_{POC\_n}} \geq G_{min}\Delta\delta \quad \frac{\Delta f_{POC}}{f_{POC\_n}} \geq \frac{\Delta\delta}{2Q_{max}} \tag{11}$$

$$\frac{\Delta f_{POC}}{f_{POC\_n}} \geq \frac{\Delta\delta}{5}$$

where:

$f_{POC\_n}$ is the nominal line frequency at the point of connection (Hz);

$\Delta f_{POC}$ is the change in line frequency at the point of connection (Hz); and $\Delta\delta$ is the change in the generator system phase angle (radians).

Thus, in a perfectly matched stable generation island (of $Q \leq 2.5$), a variation in the generator system current phase angle of 0.1 radians (5.73°) will cause the frequency to change by at least 2%.

Therefore, according to the present invention, a small deliberate variation in the generator system current phase angle can be utilized to detect a perfectly matched island by causing the frequency at the POC to vary outside the upper and lower frequency thresholds. The deliberate (active) variation may be applied periodically (for example, every 1 second, etc.) or randomly. However, the variation should have a sufficient low spectral content so as to pass through a low pass filter included within the control loop.

Further, the present invention advantageously provides a faster detection time over conventional devices because the current phase angle is actively varied, rather than actively varying the frequency. That is, the varied frequency shift has to be integrated into a phase shift and is thus slower than the detection method according to the present invention.

In addition, the required phase angle disturbance amplitude can be calculated from the upper and lower frequency thresholds as follows:

$$\Delta\delta_{var} \geq 5\frac{f_{over\_trip} - f_{under\_trip}}{f_{over\_trip} + f_{under\_trip}} \tag{12}$$

where:

$\Delta\delta_{var}$ is the amplitude of the variation in the generator system phase angle (radians);

$f_{over\_trip}$ is the upper frequency trip threshold (Hz); and $f_{under\_trip}$ is the lower frequency trip threshold (Hz).

For example, for lower and upper frequency thresholds of 59.5 Hz and 60.5 Hz, respectively, a current phase angle variation with an amplitude of only 0.05 radians (2.86°) is sufficient to cause the frequency to exceed the lower and upper frequency thresholds in a perfectly matched island.

The present invention also provides a more sensitive method of detecting a perfectly matched island. In this method, a Rate Of Change Of Frequency (ROCOF) of the generator system output is measured in combination with the small variation in the generator system current phase angle. In more detail, by using the ROCOF as a trip threshold, the variation in the generator system phase angle does not have to perturb the frequency in the island by enough to reach the lower and upper frequency thresholds. Therefore, a smaller current phase angle variation can be used.

The ROCOF protection feature according to the present invention is also advantageously faster than the above-discussed lower and upper frequency threshold protections. That is, if the changes in sign of the ROCOF are ignored, a higher frequency perturbation in the generator system phase angle can be used, which equates to a shorter detection time for a perfectly matched island.

In more detail, as noted above, $\phi_{island} = \delta$ for a perfectly matched island. Combining this relationship with equation (2) results in the following expression for the ROCOF caused by an active variation in the generator system current phase angle:

$$\left|\frac{df_{POC}}{dt}\right| = f_{POC}G\left|\frac{d\delta}{dt}\right| \tag{13}$$

$$\left|\frac{df_{POC}}{dt}\right| \geq f_{POC}G_{min}\left|\frac{d\delta}{dt}\right|$$

Further, a sinusoidal variation in the generator system current phase angle of amplitude $\Delta\delta_{var}$ and frequency $f_{\delta\_var}$ results in a sinusoidal variation in the frequency at the POC. The ROCOF will also include a sinusoidal variation the amplitude of which is bounded by the below relationship:

$$\text{Amplitude}\left(\frac{df_{POC}}{dt}\right) \geq \frac{2\Pi f_{POC}}{5}\Delta\delta_{var}f_{\delta\_var} \tag{14}$$

In addition, the minimum variation of the generator system current phase angle required to detect a perfectly matched generation island through an excessive ROCOF is as follows:

$$\Delta\delta_{var} \geq \frac{5}{4f_{POC\_n}f_{\delta\_var}G_{ROCOF}(f_{\delta\_var})}ROCOF_{lim} \tag{15}$$

where:

$\Delta\delta_{var}$ is the amplitude of the variation in generator system phase angle (radians);

$f_{\delta\_var}$ is the frequency of the variation in the generator system phase angle (Hz);

$G_{ROCOF}(f_{\delta var})$ is the gain of ROCOF measurement circuit/algorithm at $f_{\delta\_var}$;

$f_{POC\_n}$ is the nominal line frequency at the point of interconnection (Hz); and $ROCOF_{lim}$ is the trip threshold on an average absolute value of ROCOF (Hz/s).

For example, consider a generator system operating at a nominal frequency of 60 Hz, and in which a generator system current phase angle variation at 10 Hz and a ROCOF limit of 110 Hz/s is used. A typical ROCOF measurement gain at the variation frequency would be 0.71. In this case, a generator system current phase angle variation with an amplitude of only 0.03 radians (1.7°) is sufficient to cause an excessive ROCOF trip in a perfectly matched island.

Figure 9A:
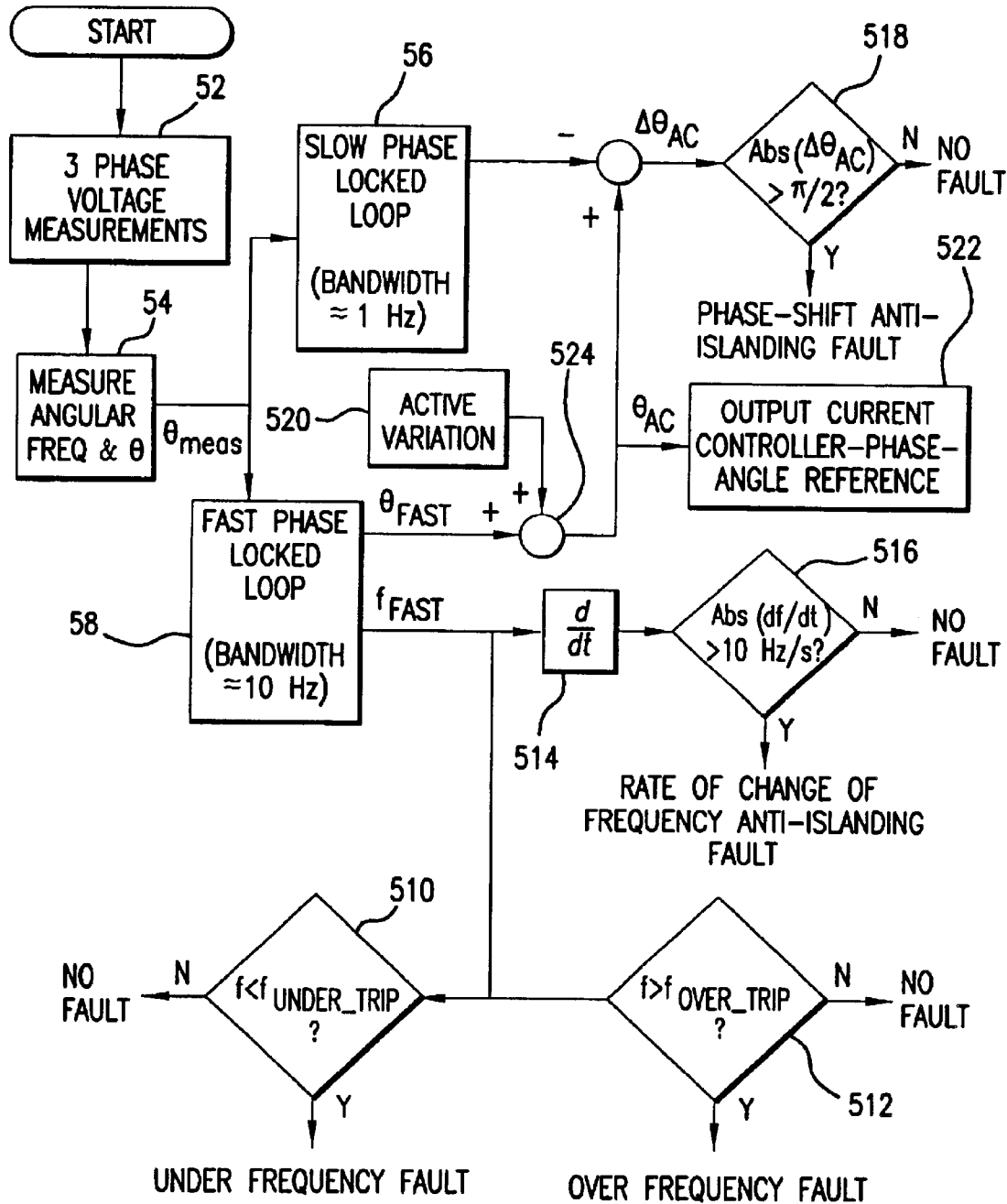
FIG. 9A is a flow chart illustrating a first example of generation island detection methods according to the present invention.

Referring now to FIG. 9A, which is a flow chart illustrating the above-noted detection methods according to the present invention (i.e., actively varying the current phase angle and measuring the frequency or rate of change of the frequency). In addition, the steps illustrated in FIG. 9A may be executed via the components (such as a computer program, electric circuits, etc.) included in power controller 201 shown in FIG. 2

The detection method of actively varying the current phase angle, measuring the output frequency, and comparing the measured frequency is illustrated by steps S2, S4, S8, S10, S12, S20, S22 and S24. In more detail, the current phase angle is actively varied in step S20 and S24, and the angular frequency and phase are measured in steps S2 and S4. The measured frequency is then passed through a fast PLL in step S8 so as to remove noise and produce a clean frequency value which is compared with lower and upper frequency thresholds in steps S10 and S12, respectively. Note the actively varied current phase angle determined in steps S20 and S24 is the output current phase angle reference (shown in step S22) at the output of power converter 206 shown in FIG. 2.

If the frequency value is less than the lower frequency threshold (Yes in step S10), a generation island is detected and the generator system is commanded to stop the generator system from delivering electric power to the electric power system. Otherwise, no fault is detected (No in step S10). Similarly, if the frequency value is greater than the upper frequency threshold (Yes in step S12), a generation island is detected and the generator system is commanded to stop delivering electric power to the electric power system. Otherwise, no fault is detected (No in step S12).

The detection method of actively varying the current phase angle and measuring the rate of change of the output frequency (or the magnitude of the rate of change of frequency) is illustrated by steps S2, S4, S8, S14 and S16, S20, S22 and S24. In more detail, the current phase angle is actively varied in steps S20 and S24, and the angular frequency and phase are measured in steps S2 and S4. The measured frequency is then passed through a fast PLL in step S8 so as to remove noise and produce a clean frequency signal. Further, the rate of change of the frequency value is determined in step S14. An absolute value of the rate of change of frequency is then compared with a predetermined threshold (10 Hz/s in FIG. 9A). If the absolute value of the rate of change of frequency is greater than the predetermined threshold (Yes in step S16), a generation island is detected and the generator system is connected to stop delivering electric power to the electric power system. Otherwise, no fault is detected (No in step S16).

Turning now to yet another detection method according to the present invention. In this method, the steps S2, S4, S6, S8 and S18 are executed. In more detail, the angular frequency and phase are measured in steps S2 and S4. The measured frequency is then passed through a slow PLL in step S6 and a fast PLL in step S8 so as to remove noise and produce clean slow and fast phase angles, respectively.

In addition, it is noted both the fast PLL and the slow PLL have a sufficient bandwidth to track real frequency changes within the electric power system. Therefore, the angle and frequency estimates produced by both PLLs are near identical when the generator system is operating in parallel with synchronous generators in the electric power system. However, when an unstable generation island is formed, the fast PLL rapidly changes in angle and frequency. Further, as shown in step S18, an absolute value of a phase shift between the fast and slow PLL is compared with π/2. If the absolute value exceeds π/2, the generator system will be commanded to stop energizing the POC and to initiate a shutdown (Yes in step S18). Otherwise, the generator system continues to operate (No in step S18).

In addition, this phase-shift protective function provides coordination between the anti-islanding protection in the generator system and high speed reclosing of isolating devices in the electric power system. That is, by ensuring the phase-shift in the island is not more than π/2, any voltage transients that occur following an out of phase reclosure will not be any greater than transients that occur during a reclosure into a dead line. The phase-shift protection method according to the present invention therefore helps to ensure coordination with super high speed reclosing schemes used in the electric power system.

Figure 9B:
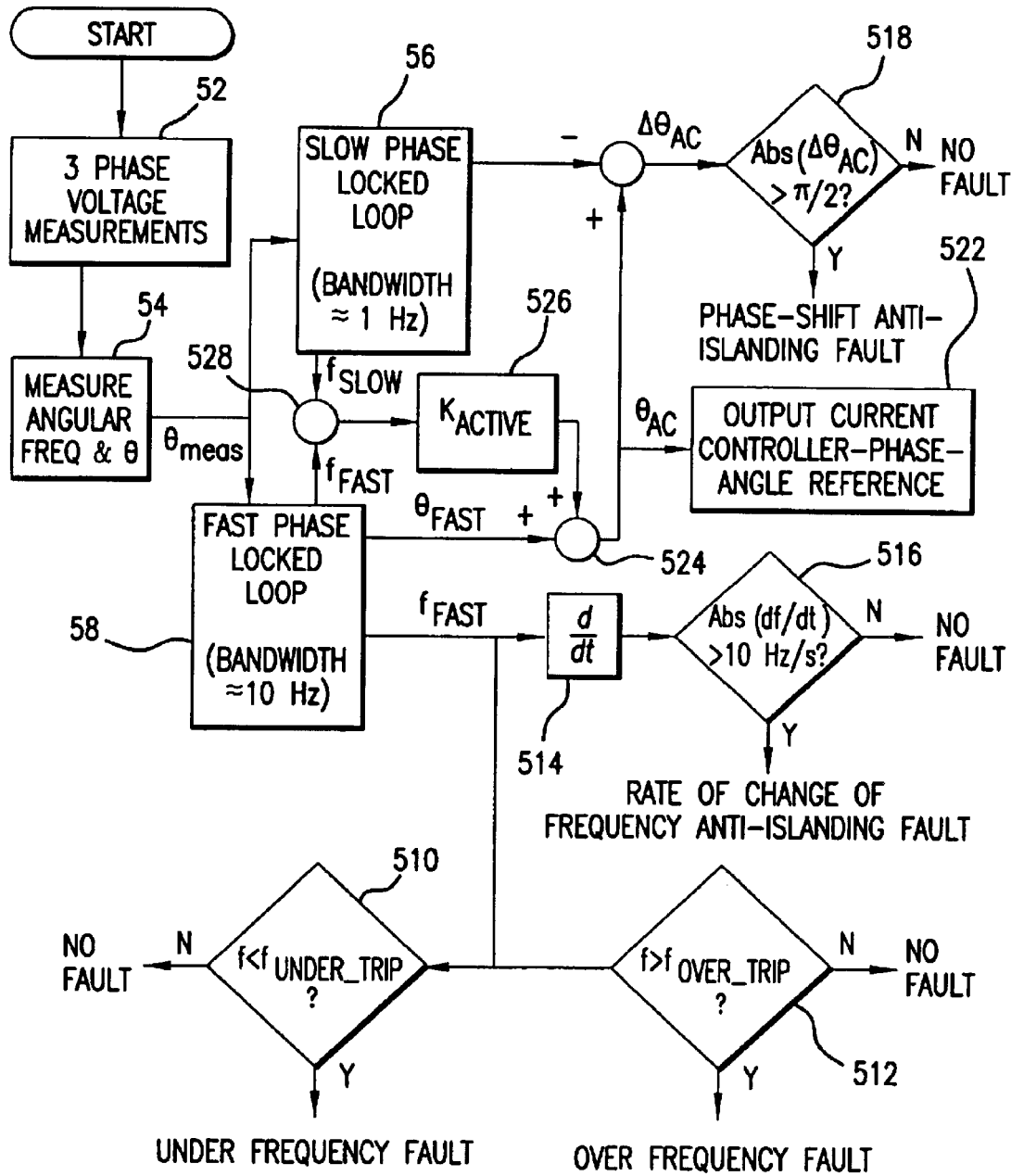
FIG. 9B is a flow chart illustrating a second example of detection methods according to the present invention.

In still another example, as illustrated in FIG. 9B, the present invention provides a phase angle destabilization method used to destabilize islands that are otherwise stable. This method is illustrated by steps S2, S4, S6, S8, S22, S24, S26 and S28 in FIG. 9B. Note, this method can also be implanted with the ROCOF feature described above. In the example shown in FIG. 9B, the output current phase angle is increased whenever an increase in frequency is detected. To help explain how the phase-angle destabilization method operates, the generalized condition for a generation island to be stable is first examined. In more detail, when δ is time varying, the island will be stable if and only if:

$$\left.\frac{d\phi_{Island}}{d\omega}\right|_{\omega=\omega_0} - \left.\frac{d\delta}{d\omega}\right|_{\omega=\omega_0} < 0 \tag{16}$$

Further, the demanded current phase angle δ can be defined as follows:

$$\delta = K_{active}(f_{fast} - f_{slow}) \tag{17}$$

In addition, a perturbation on the frequency $\Delta f_{POC}$ at the POC will result in a perturbation in the fast PLL frequency, $\Delta f_{fast}$, a perturbation in the slow PLL frequency, $\Delta f_{slow}$, and a perturbation in the output current phase angle, Δδ. In the time period between the response time of the fast PLL and the response time of the slow PLL, $\Delta f_{fast} >> \Delta f_{slow}$ and thus the perturbation in the slow PLL frequency can be ignored. This time period is of interest because the output current phase angle dynamics are governed by the response time of the fast PLL as follows:

$$\Delta\delta = K_{active}(\Delta f_{fast} - \Delta f_{slow}) \approx K_{active} \cdot \Delta f_{fast} \tag{18}$$

Further, $f_{fast} = f_{POC}$ because the fast PLL is used to operate the current control method. Thus, substituting this expression into equation (18), it is evident that in the time period of interest, the current phase angle variation with frequency at the POC is governed by the following equation:

$$\frac{d\delta}{d\omega} \approx \frac{\Delta\delta}{2\Pi \cdot \Delta f_{POC}} \approx \frac{K_{active}}{2\Pi} \tag{19}$$

Further, as noted above in equation (9), for $Q \geq 1 \sqrt{8}$:

$$\left.\frac{d\phi_{Island}}{d\omega}\right|_{\omega=\omega_0} \leq \frac{2Q}{\omega} \tag{20}$$

Thus, the combination of equations (16), (19) and (20) establishes a relationship that determines the minimum value of $K_{active}$ to ensure that all islands up to a given Q factor will be destabilized by the active phase angle destabilization method as follows:

$$K_{active} > \frac{2Q}{f_{POC\_n}} \tag{21}$$

Further, in this example, the active frequency shift gain setting is Kactive≈0.3. This ensures islands with Q factors of 7.5 or less will be unstable and therefore rapidly detected at nominal line frequencies of both 50 Hz and 60 Hz. The time between the creation of the island supported by the generator system and the time at which the generator system detects the island and stops energizing the electric power system is typically less than 10 cycles. This performance meets and exceeds the requirements of IEEE 929.

In addition, the ability of the active phase angle destabilization method to destabilize a generation island is not adversely affected by the presence of other anti-islanding distributed resources contained within the island. Indeed, many other distributed resource types use compatible active frequency shift techniques and all of these systems will act together to destabilize the island.

Further, as discussed above, the Rate Of Change Of Frequency (ROCOF) and phase shift protection functions may be used in conjunction with active phase angle destabilization algorithm according to the present invention. This combined scheme is compatible with other destabilizing anti-islanding schemes.

Turning now to FIG. 9B for a further detailed explanation of the destablization method according to the present invention. As shown, the output frequency characteristic of the generator system is measured in steps S2 and S4, a first phase angle and frequency of the measured frequency characteristic is estimated using a first phase locked loop having a first bandwidth in step S6, and a second phase angle and frequency of the measured frequency characteristic is estimated using a second phase locked loop having a second bandwidth greater than the first bandwidth in step S8. Further, the method calculates a frequency difference between the first and second estimated frequencies in step S28, and calculates an angle variation that is proportional to the calculated frequency difference in step S26. The estimated second phase angle is then added to the calculated angle variation in step S24 so as to form an output current phase angle reference. In addition, the output current phase angle of the generator system is controlled to be aligned with the output current phase angle reference in step S22. The method also determines whether or not the generator system is within a generation island based on the measured frequency characteristic (e.g., by using the ROCOF and frequency detection method discussed above with reference to FIG. 9A).

Further, the detection methods according to the present invention can detect generation islands in less than one second. This is a significant improvement over conventional detection method.

Additionally, the response time for the anti-islanding detection based on the above-discussed under frequency, over frequency, excessive ROCOF and excessive phase-shift protective functions is affected by the need to reject swings in frequency or in the voltage phase angle that occur in normal operation at the POC. For generator systems swings in the voltage phase angle are likely to be the most significant.

Figure 10:
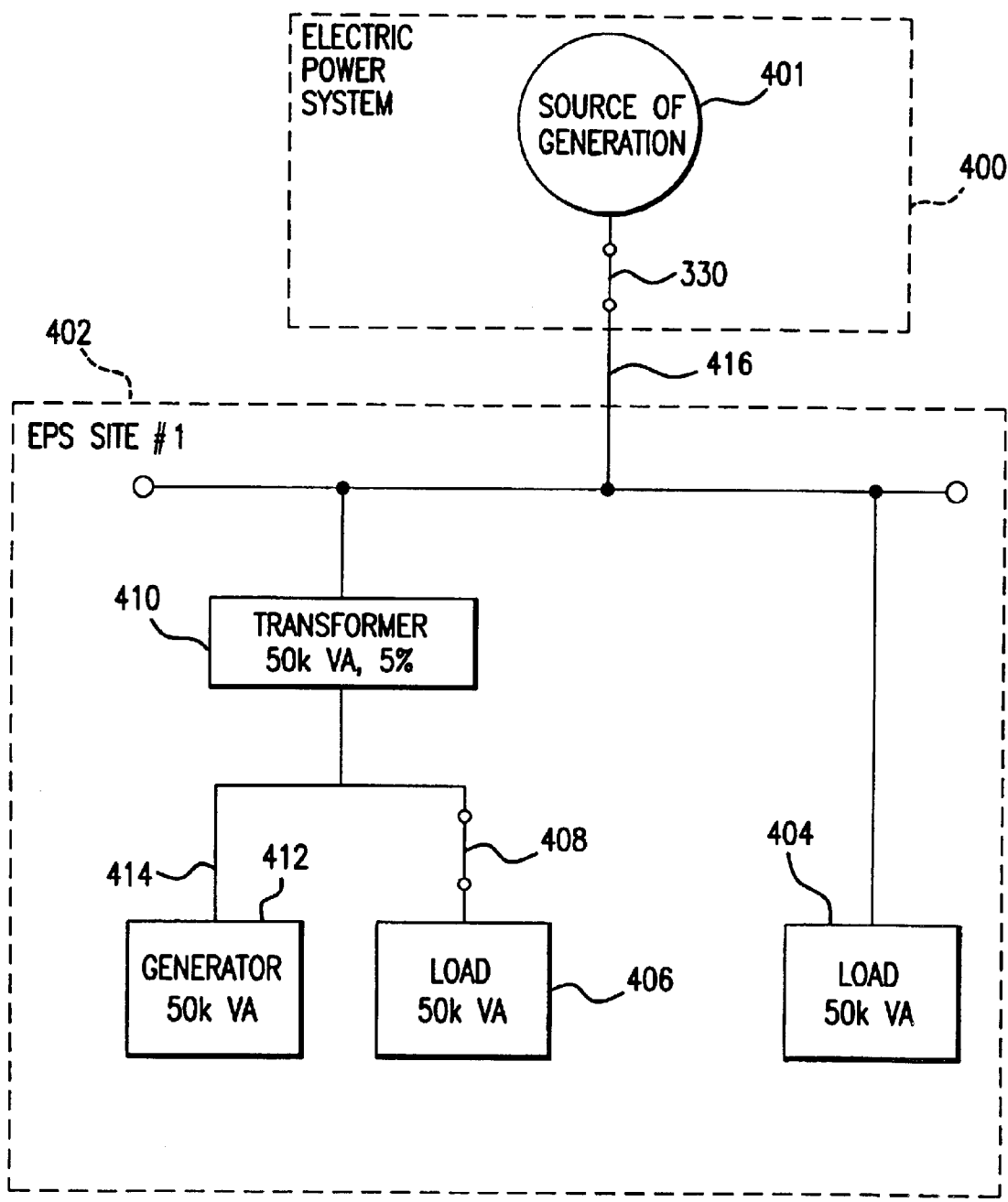
FIG. 10 is an overview of an electric power system and connected sites for illustrating voltage phase swings during normal operation.

For example, consider the case illustrated in FIG. 10. In this example, an electric power system 400 including source of generation 401 is coupled to site 402. Site 402 includes transformer 410, generator system 412 and two loads 404, 406. Load 406 is connected to transformer 410 via switch 408. Due to impedances contributed to by source of generation 401 and transformer 410, the voltage phase angle at POC 414 swings each time switch 408 is opened or closed. Further, if load 406 is a constant resistive load, the phase swing will be of the order of 0.075 radians. If load 406 is a filament lighting load with an inrush current of 10 times the steady state load, the phase swing when switch 408 is closed can be as high as 0.64 radians.

$$T_{uf\_trip} > \frac{\theta_{swing\_max}}{2\Pi(f_{op\_min} - f_{under\_trip})} \qquad (22)$$

$$T_{of\_trip} > \frac{\theta_{swing\_max}}{2\Pi(f_{over\_trip} - f_{op\_max})}$$

In addition, over a short enough measurement period, a swing in the voltage phase angle is indistinguishable from a change in frequency. Accordingly, the trip times for the under frequency, over frequency and ROCOF thresholds must be long enough to prevent nuisance trips due to misinterpretation of swings in the voltage phase angle as frequency deviations. Suitable lower bounds can be placed on the trip times once the minimum normal operating frequency, maximum normal operating frequency and trip thresholds are known. That is, the following equations may be used to determine these limits:

where:

$\theta_{swing\_max}$ is the maximum anticipated swing in voltage phase angle (radians);

$f_{under\_trip}$ is the under frequency trip threshold (Hz);

$f_{over\_trip}$ is the over frequency trip threshold (Hz);

$f_{op\_min}$ is the minimum operating frequency without nuisance under frequency trips (Hz);

$f_{op\_max}$ is the maximum operating frequency without nuisance over frequency trips (Hz);

$T_{uf\_trip}$ is the under frequency trip time(s); and $T_{of\_trip}$ is the over frequency trip time(s).

Generally, in an operational system, voltage phase angle swings in excess of an eighth of a cycle are unlikely ($\theta_{swingmax}=\pi/4$). Thus, to prevent nuisance trips with this size of phase swing for a system operating at least 0.5 Hz away from the under frequency or over frequency trip thresholds, the trip times must be at least 0.25 seconds. Accordingly, the under frequency and over frequency protection trip times are preferably set to a minimum of 0.25 seconds (where electric power system interconnection rules permit).

The ROCOF protection method provided by the present invention is also sensitive to nuisance trips caused by voltage phase angle swings. Further, the ROCOF protective functions provided in the generator are set up to reject phase angle swings of up to $\pi/4$. The phase-shift protection is set to trip at a phase difference of $\pi/2$ and will thus be able to reject the phase angle swings associated with sudden load changes.

In addition, the magnitude and frequency of the generator system phase angle variation, the response time of the ROCOF measurement method, the ROCOF trip threshold and trip time affect the time taken to detect a perfectly matched generation island. Accordingly, these variables are preferably coordinated to ensure that the anti-islanding protection is effective and rapid without introducing the possibility of nuisance trips.

In addition, the method of anti-islanding protection depends on coordination of internal dynamic variables associated with the generator system phase angle control, the PLL and the protection. The method is also invariant from one electric power system to another. Therefore, the settings associated with the selected method of anti-islanding protection are preferably not adjustable.

Further, a preferred method of verifying the proper anti-islanding operation is to test an example of the generator system operating in a perfectly matched island with a Q factor of 2.5.

Also, as noted above, the present island detection and anti-islanding protection methods correspond to a generator system such as the MICRO-TURBINE connected to a utility grid. The present invention also applies to other generation types employing closed-loop control of output current magnitude and phase-angle, such as electronic power converter output based generators and synchronous generators with appropriate control of shaft speed and excitation voltage.

The present invention also relates to a computer program product for implementing the detection and anti-islanding methods discussed above. Accordingly, this invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method of controlling a generator system connected to an electric power system, comprising:

measuring an output frequency characteristic of the generator system;

estimating a first phase angle of the measured frequency characteristic using a first phase locked loop having a first bandwidth;

estimating a second phase angle of the measured frequency characteristic using a second phase locked loop having a second bandwidth greater than the first bandwidth;

calculating a phase shift between the estimated first and second phase angles; and determining whether or not the generator system is within a generation island based on the calculated phase shift.

2. The method according to claim 1, further comprising:

stopping the generator system from delivering electric power to the electric power system if the determining step determines the generator system is within a generation island.

3. The method according to claim 1, wherein the determining step determines the generator system is within a generation island if an absolute value of calculated phase shift is greater than a predetermined threshold.

4. The method according to claim 3, wherein the predetermined threshold is $\pi/2$.

5. The method according to claim 1, wherein the first and second bandwidths are approximately 1 Hz and 10 Hz, respectively.

6. The method according to claim 1, wherein the determining step determines whether or not the generator system is within a generation island in less than 1 second.

7. A system for controlling a generator system connected to an electric power system, comprising:

means for measuring an output frequency characteristic of the generator system;

means for estimating a first phase angle of the measured frequency characteristic using a first phase locked loop having a first bandwidth;

means for estimating a second phase angle of the measured frequency characteristic using a second phase locked loop having a second bandwidth greater than the first bandwidth;

means for calculating a phase shift between the estimated first and second phase angles; and means for determining whether or not the generator system is within a generation island based on the calculated phase shift.

8. The system according to claim 7, further comprising:

means for stopping the generator system from delivering electric power to the electric power system if the determining means determines the generator system is within a generation island.

9. The system according to claim 7, wherein the determining means determines the generator system is within a generation island if an absolute value of calculated phase shift is greater than a predetermined threshold.

10. The system according to claim 9, wherein the predetermined threshold is $\pi/2$.

11. The system according to claim 7, wherein the first and second bandwidths are approximately 1 Hz and 10 Hz, respectively.

12. The system according to claim 7, wherein the determining means determines whether or not the generator system is within a generation island in less than 1 second.

13. In a generator system connected to an electric power system, the improvement comprising:

a measuring circuit configured to measure an output frequency characteristic of the generator system;

a first phase locked loop having a first bandwidth and configured to estimate a first phase angle of the measured frequency characteristic;

a second phase locked loop having a second bandwidth greater than the first bandwidth and configured to estimate a second phase angle of the measured frequency characteristic;

a calculating circuit configured to calculate a phase shift between the estimated first and second phase angles; and a determining circuit configured to determine whether or not the generator system is within a generation island based on the calculated phase shift.

14. The system according to claim 13, further comprising:

a disconnecting circuit configure to stop the generator system from delivering electric power to the electric power system if the determining circuit determines the generator system is within a generation island.

15. The system according to claim 13, wherein the determining circuit determines the generator system is within a generation island if an absolute value of calculated phase shift is greater than a predetermined threshold.

16. The system according to claim 15, wherein the predetermined threshold is $\pi/2$.

17. The system according to claim 13, wherein the first and second bandwidths are approximately 1 Hz and 10 Hz, respectively.

18. The system according to claim 13, wherein the determining circuit determines whether or not the generator system is within a generation island in less than 1 second.

* * * * *

UNITED STATES PATENT AND TRADEMARK OFFICE
CERTIFICATE OF CORRECTION

PATENT NO. : 6,864,595 B2
DATED : March 8, 2005
INVENTOR(S) : Wall

It is certified that error appears in the above-identified patent and that said Letters Patent is hereby corrected as shown below:

Column 2,
Line 66, replace "combustorturbine" with -- combustor-turbine --.

Column 3,
Line 2, replace "compressorturbine" with -- compressor-turbine --.

Column 12,
Line 23, insert the following line before formula (7):

--In more detail, for $Q < 1\sqrt{8}$, $G_{inv}(\omega_n, Q)$ is maximized when:--.

Signed and Sealed this

Fifth Day of July, 2005

JON W. DUDAS
*Director of the United States Patent and Trademark Office*